United States Patent [19]
Morimoto et al.

[11] Patent Number: 5,221,588
[45] Date of Patent: Jun. 22, 1993

[54] METHOD FOR RECORDING AND ERASING INFORMATION

[75] Inventors: Isao Morimoto; Masanobu Sato; Kouichi Mori, all of Fuji, Japan

[73] Assignee: Asahi Kasei Kogyo K.K., Osaka, Japan

[21] Appl. No.: 785,248

[22] Filed: Nov. 4, 1991

Related U.S. Application Data

[63] Continuation of Ser. No. 191,061, May 6, 1988, abandoned.

[30] Foreign Application Priority Data

Jun. 11, 1987 [JP] Japan .................. 62-144030
Jul. 8, 1987 [JP] Japan .................. 62-168775
Dec. 25, 1987 [JP] Japan .................. 62-328712

[51] Int. Cl.$^5$ .......................... G03C 1/72; G11B 7/24
[52] U.S. Cl. ..................... 430/19; 430/495; 430/945; 346/135.1
[58] Field of Search ............... 430/19, 270, 495, 945; 428/64; 346/135.1

[56] References Cited

U.S. PATENT DOCUMENTS

| | | | |
|---|---|---|---|
| 4,461,807 | 7/1984 | Mori et al. | 346/135.1 |
| 4,499,178 | 2/1985 | Wada et al. | 439/495 |
| 4,500,889 | 2/1985 | Wada et al. | 430/945 |
| 4,731,780 | 3/1988 | Kivits et al. | 369/284 |
| 4,818,666 | 4/1989 | Gravesteijn et al. | 430/19 |
| 4,954,379 | 9/1990 | Nishida et al. | 428/64 |

FOREIGN PATENT DOCUMENTS 0217293 4/1987 European Pat. Off. .
62-152786 7/1987 Japan .

OTHER PUBLICATIONS

M. Chen et al, "Reversibility and stability of tellurium alloys for optical data storage applications", Appln. Phys. Lett. 46 (8), 1985.

R. Barton et al, "New phase change material for optical recording with short erase time", Appl. Phys. Lett. 48 (19), 1986.

M. Chen et al, "Compound materials for reversible, phase-change optical data storage", Appl. Phys. Lett. 49 (9), 1986.

T. Nishida et al, "Single-beam overwrite experiment using In-Se based phase-change optical media", Appl. Phys. Lett. 50 (11), 1987.

A. Bell et al, "Antireflection Structures for Optical Recording", IEEE Journal of Quantum Electronics, vol. QE-14, No. 7, p. 487 (1978).

*Primary Examiner*—Lee C. Wright
*Attorney, Agent, or Firm*—Birch, Stewart, Kolasch & Birch

[57] ABSTRACT

A method for recording and erasing information by irradiating a specific recording medium with a single laser beam, which is applied with two different intensities respectively for crystallizing a recording layer of the recording medium and for amorphizing a recording layer of the recording medium. According to the present invention, both the recording of information and the erasing of information can be simply performed using a single laser beam by changing only its intensity between the two different laser beam intensities according to a laser beam intensity pattern corresponding to predetermined information.

The recording material comprises Sb, Te, Ge and at least one element selected from the group consisting of Pb, Bi, In, Sn and Tl.

5 Claims, 3 Drawing Sheets

METHOD FOR RECORDING AND ERASING INFORMATION

This application is a continuation of application Ser. No. 07/191,061 filed on May 6, 1988, now abandoned.

BACKGROUND OF THE INVENTION

1. Field of the Invention

This invention relates to a method for recording and erasing information by irradiating a recording medium with a laser beam. More particularly, the present invention is concerned with a method for recording and erasing information by irradiating a recording medium with a single laser beam which is applied to the recording medium with two different intensities, respectively, for recording information on a recording medium and for erasing information recorded on a recording medium. According to the method of the present invention, both the recording and erasing of information can be easily performed using a simple optical system by changing only the laser beam intensity.

2. Discussion of Related Art

Recently, according to the increasing amount of information, the utilization of optical disks and optical cards as materials for recording information has been increased because of the large amount of information that can be recorded on optical disks and optical cards at a high density and the non-destructive readout of the recorded information on the optical disks and the optical cards can easily be made by means of a laser beam.

With respect to the optical disks, the two types known are a write-once optical storage type and a reversible optical storage type.

In the case of the former type of optical disk, information can be recorded only once and the recorded information cannot be erased. On the other hand, in the case of the latter type of optical disk, information can be recorded and erased repeatedly.

With respect to the reversible optical storage type of optical disk, two types of recording materials are known. One is a magneto-optical recording material and the other is a phase-change recording material In the case of the magneto-optical recording material, information is recorded by utilizing occurrence of the difference in direction of magnetization by irradiation with a laser beam, and the recorded information is read out by utilizing the difference in the plane of polarization of a laser beam reflected by the recording material, in which the difference in the plane of polarization is ascribed to the difference in the direction of magnetization. On the other hand, in the case of the phase-change recording material, information is recorded by utilizing occurrence of the difference in the state of a recording material by irradiation with a laser beam, that is, amorphous or crystalline, and the recorded information is read out by utilizing the difference in the optical properties, which difference is ascribed to the difference in the state of a recording material. In the case where a magneto-optical recording material is used for recording and reading out information, it is necessary to use an apparatus comprising a magnetic recording system and an optical reading system. On the other hand, in the case where a phase-change recording material is used for recording and reading out information, both the recording of information and the reading out of the information can be conducted using an optical system only. Accordingly, the phase-change recording material is advantageous in that an apparatus for recording and reading out information is simple as compared with the case where the magneto-optical recording material is used.

In the case of the phase-change recording material, another mode for recording and erasing information is conceivable. That is, information is recorded on the recording material utilizing occurrence of the difference in volume by irradiation with an electron beam between the irradiated area and the non-irradiated area. Utilizing the difference in the volume caused by the irradiation with an electron beam, information is recorded at a high density as compared with the case where the difference in the state of a recording material is utilized. The utilization of the difference in the volume of a recording layer caused by the irradiation with an electron beam has not yet been realized at the present time, but it is expected to come true in the near future.

With respect to the recording layers of the phase-change recording materials, it is known to use various Te alloys, such as a Te-Ge alloy [Appl. Phys. Lett., 49 (9), p. 502, (1986)]and Te-Ge-Sn alloy [Appl. Phys. Lett., 46 (8), p. 734, (1985), and various Se alloys, such as an Sb-Se alloy [Appl. Phys. Lett., 48 (9), p. 1255, (1986)] and an In-Se-Tl alloy [Appl Phys Lett., 50 (11), p. 667, (1987)]. The recording layers of these alloys can be amorphized when the recording layers are melted and then rapidly cooled. The recording layers can be crystallized when the recording layers are melted and then gradually cooled, or when the recording layers are heated for a predetermined period of time at temperatures higher than the critical temperatures for crystallization of the recording layers. The recording layers have different optical properties between the amorphous state and the crystalline state. Therefore, information can be recorded on the recording materials utilizing the occurrence of the difference in optical properties between the amorphous state and the crystalline state. For example, the amorphous state and the crystalline state may be designed so as to correspond to the recorded state and the erased state, respectively. In this case, the recording of information can be effected by the rapid heating and the rapid cooling of a recording layer, and the erasing of the recorded information can be effected by the gradual heating and the gradual cooling of the recording layer. Therefore, by repeating the rapid heating-rapid cooling and the gradual heating-gradual cooling, the recording and erasing can be repeatedly carried out. The crystallization and amorphization of a recording layer can be conducted by irradiating with a laser beam. Of course, alternatively, the crystalline state and the amorphous state may also be designed so as to correspond to the recorded state and the erased state, respectively. For easy understanding, however, an explanation will be made hereinbelow with respect to the case where the amorphous state and the crystalline state correspond to the recorded state and the erased state, respectively, unless otherwise described.

As mentioned above, when information recorded on the above-mentioned conventional recording material is erased, that is, the crystallization of the recording layer is effected, gradual heating and gradual cooling must be conducted, whereas when information is recorded on the conventional recording material, that is, the amorphization of the recording material is effected, rapid heating and rapid cooling must be conducted. The rapid heating and the rapid cooling can be performed by a short irradiation period with a laser beam of a high intensity, whereas the gradual heating and the gradual cooling can be performed by a long irradiation period with a laser beam of a low intensity. In practice, however, performing of both the short and long irradiation periods are accompanied by difficulties. In operating the phase-change type information recording and erasing system, a recording layer is migrated relative to a laser beam at a constant speed. When a laser beam spot is applied to a recording layer for recording or erasing information at a certain point on the recording layer, the point continues to be irradiated with the laser beam during the passage of the point through the width of the laser beam spot. Therefore, whether the irradiation period of time is short or long, would depend upon the width of the laser beam spot. Therefore, for performing both the short irradiation period for amorphization of a recording material and the long irradiation period for crystallization of a recording material, two laser beams have conventionally been used, i.e. a laser beam having a circular irradiation spot and a laser beam having an elliptic irradiation spot. Such an irradiation system using two laser beams has disadvantages in that it is necessary to use a complicated apparatus which comprises two laser beam irradiation systems and that the two laser beam irradiation systems must be so arranged that the axis of one of the laser beams is coincident with the axis of the other laser beam with high precision in order to repeatedly record and erase information with accuracy. However, it is difficult as a practical matter, to coincide the axes of both laser beams with each other. Particularly in the case where high speed recording and erasing is intended to perform, it is necessary to use a laser beam for the crystallization of a recording medium, which has an ellipitic beam spot of a considerably large length in its long axis. However, the use of such laser beam is not practical.

SUMMARY OF THE INVENTION

The present inventors have made extensive and intensive studies with a view toward developing a method for recording and erasing information at high speed by the irradiation with a single laser beam, which method is free from the above-mentioned disadvantages accompanying the use of the conventional recording material. As a result, it has been found that information can be easily recorded and erased by the irradiation with a single laser beam by changing only the intensity of the laser beam when an alloy having a specific composition is used as a material for an information recording layer. Based on such a novel finding, the present invention have been completed.

It is, therefore, an object of the present invention is to provide a novel method for easily recording and erasing information by the irradiation with a single laser beam.

The foregoing and other objects, features and advantages of the present invention will be apparent to those skilled in the art from the following detailed description and appended claims taken in connection with the accompanying drawings.

DETAILED DESCRIPTION OF THE INVENTION

Figure 1:
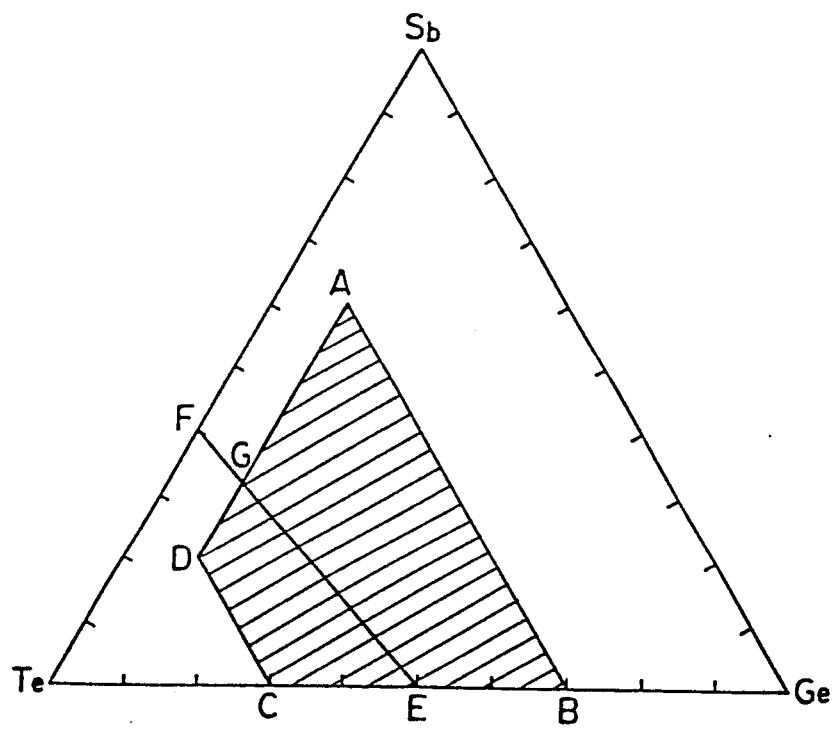
FIG. 1 is a triangular diagram illustrating a Sb-Te-Ge composition range to be used in the present invention.

According to the present invention, there is provided a method for recording and erasing information, which comprises irradiating a recording medium comprising a substrate and superimposed thereon a recording layer composed of Sb, Te, Ge and at least one element selected from the group consisting of Pb, Bi, In, Sn and Tl with a single laser beam, while migrating said recording layer relative to said laser beam, said recording layer being capable of reversibly converting between an amorphous phase and a crystalline phase in accordance with a laser beam intensity applied to the recording layer, the reversible conversion being effective for recording and erasing information, said single laser beam being applied with two different intensities, respectively, for crystallizing said recording layer and for amorphizing said recording layer, while changing the laser beam intensity between said two different intensities in accordance with a laser beam intensity pattern corresponding to predetermined information, to thereby form amorphous areas and crystalline areas in the recording layer, which correspond to said predetermined information.

In the method of the present invention, a recording medium comprising a substrate and superimposed thereon a recording layer is used. With respect to the recording layer, it is essential that the recording layer be composed of Sb, Te, Ge and at least one element selected from the group consisting of Pb, Bi, In, Sn and Tl. Such a recording layer is capable of reversibly converting between an amorphous phase and a crystalline phase in accordance with a laser beam intensity applied to the recording layer, and the reversible conversion is effective for recording and erasing information. Particularly, it is preferred that Sb, Te, Ge and the element selected from the group consisting of Pb, Bi, In, Sn and Tl are present in atomic ratios represented by the formula (1):

$$(Te_xGe_ySb_{1-x-y})_{1-z}M_z \qquad (1)$$

wherein M is at least one element selected from the group consisting of Pb, Bi, In, Sn and Tl, and $0.3 \leq x \leq 0.7$, $0.1 \leq y$, $0.01 \leq z \leq 0.3$ and $x+y<1$.

With respect to the recording layer to be used in the method of the present invention, the presence of the element M is important. Without the element M, various serious problems are involved. For example, if the recording layer is composed only of Sb, Te and Ge, and Sb, Te and Ge are present in atomic ratios represented by the formula (2):

$$Te_xGe_ySb_{1-x-y} \qquad (2)$$

wherein x is 0.3 to 0.7, the recording layer can be crystallized by a short irradiation period with a laser beam. However, for amorphizing the recording layer, it is necessary to irradiate with a laser beam at such a high intensity that deformation of the recording layer and substrate would occur or that perforation of the recording layer would occur. Particularly, in the case where a recording layer is made of a mixture of a GeTe compound and an $Sb_2Te_3$ compound, and Sb, Te and Ge are present in atomic ratios represented by the formula (3):

$$(GeTe)_x(Sb_2Te_3)_{1-x} = Te_{3-2x}Ge_xSb_{2-2x} \quad (3)$$

wherein $0 < x < 1$, the crystallization of the recording layer can be easily conducted, but it is difficult to conduct amorphization of the recording layer because it is necessary to irradiate with a laser beam at such a high intensity that deformation of the recording layer and substrate would occur or that perforation of the recording layer would occur.

In the method of the present invention in which a recording layer composed of not only Sb, Te and Ge but also at least one element M selected from the group consisting of Pb, Bi, In, Sn and Tl is used, the above-mentioned drawbacks can be obviated. Especially when element M is present in a recording layer in an amount of 1 to 30% in terms of the number of atoms, the recording layer is quite advantageous because the amorphization can be easily conducted by irradiation with a laser beam of a relatively low intensity as compared with the case where element M is not present, enabling the deformation of a recording layer and a substrate or the perforation of a recording layer to be avoided. If the amount of element M in terms of the number of atoms is less than 1% based on the total number of atoms in the recording layer, a laser beam of a relatively high intensity is required for amorphizing a recording layer. Therefore, the amorphization of a recording layer is inevitably accompanied by an undesirable deformation of a recording layer and a substrate or perforation of a recording layer. On the other hand, if the amount of element M in terms of the number of atoms exceeds 30%, the recording layer is hardly crystallized to a sufficient degree upon irradiation with a laser beam and, therefore, the erasing of information cannot be conducted sufficiently, while when re-recording is conducted, a signal intensity sufficient for distinguishing the recording of information from the erasing of information (i.e., contrast) cannot be obtained.

With respect to the amount of Ge, it is disadvantageous that y in the formula (1) is less than 0.1, because a recording layer is crystallized at a low temperature and, therefore, poor in heat stability.

In summary, it is preferred that in formula (1), x be within the range of from 0.3 to 0.7 from the standpoint of easy crystallization, y be 0.1 or more from the standpoint of heat stability, and z be within the range of from 0.01 to 0.3 from the standpoint of easy amorphization by the irradiation with a laser beam of a relatively low intensity without occurrence of the deformation of a recording layer and a substrate and the perforation of a recording layer.

As mentioned above, M is at least one element selected from the group consisting of Pb, Bi, In, Sn and Tl. In the case where two or more types of elements are used as M, the total amount of the elements in terms of the number of atoms should be within the range represented by z mentioned above. In FIG. 1, the preferred Sb-Te-Ge composition range is indicated by the hatched area defined by a square ABCD. The composition range inside a square ABEG is more advantageous for rapid crystallization of a recording layer. Incidentally, a line EF in FIG. 1 indicates the Sb-Te-Ge composition range corresponding to the composition represented by the formula (2).

The reason why the amorphization of a recording layer becomes easy by incorporating element M in a Te-Ge-Sb alloy is believed to reside in that elements Pb, Bi, In, Sn and Tl have a relatively low melting point, and heat of fusion for these elements is relatively small as compared with those of Te, Ge and Sb, as shown in Table 1 and, therefore, by the incorporation of these elements in a Te-Ge-Sb alloy, the melting point of the recording layer becomes low, and the recording layer becomes easy to heat and cool rapidly. Further, the vapor pressures of these elements are low even at a temperature higher than their melting points and, therefore, the deformation and the perforation of a recording layer are unlikely to occur.

TABLE 1

| Element | Melting point (°C.) | Heat of fusion (cal/g) | Temperature at which the vapor pressure rises to 100 Torr (°C.) |
| --- | --- | --- | --- |
| Pb | 327 | 6.3 | 1427 |
| Bi | 271 | 12.5 | 1302 |
| In | 156 | 6.8 | 1727 |
| Sn | 232 | 14.5 | 2227 |
| Ti | 303 | 5.0 | 1212 |
| Te | 449 | 32 | 792 |
| Ge | 937 | — | 2407 |
| Sb | 630 | 38.3 | 1262 |

As mentioned above, a recording layer composed of Sb, Ge, Te and at least one element selected from the group consisting of Pb, Bi, In, Sn and Tl in atomic ratios represented by formula (1) can be not only easily amorphized without occurrence of the deformation of a recording material and a substrate and the perforation of a recording layer, but also easily crystallized by irradiation with a laser beam for an extremely short period of time. Using a recording medium comprising such a recording layer, information can be recorded and erased by irradiating the recording layer with a single laser beam which is applied separately with two different intensities respectively for crystallizing the recording layer and for amorphizing the recording layer.

In practicing the method of the present invention, the amorphization of a recording layer may be performed for recording information on the recording layer, while separately performing the crystallization of the recording layer for erasing information recorded on the recording layer. Alternatively, the amorphization of a recording layer may also be performed for erasing information recorded on said recording layer, while separately performing the crystallization of the recording layer for recording information on the recording layer.

Figure 3:
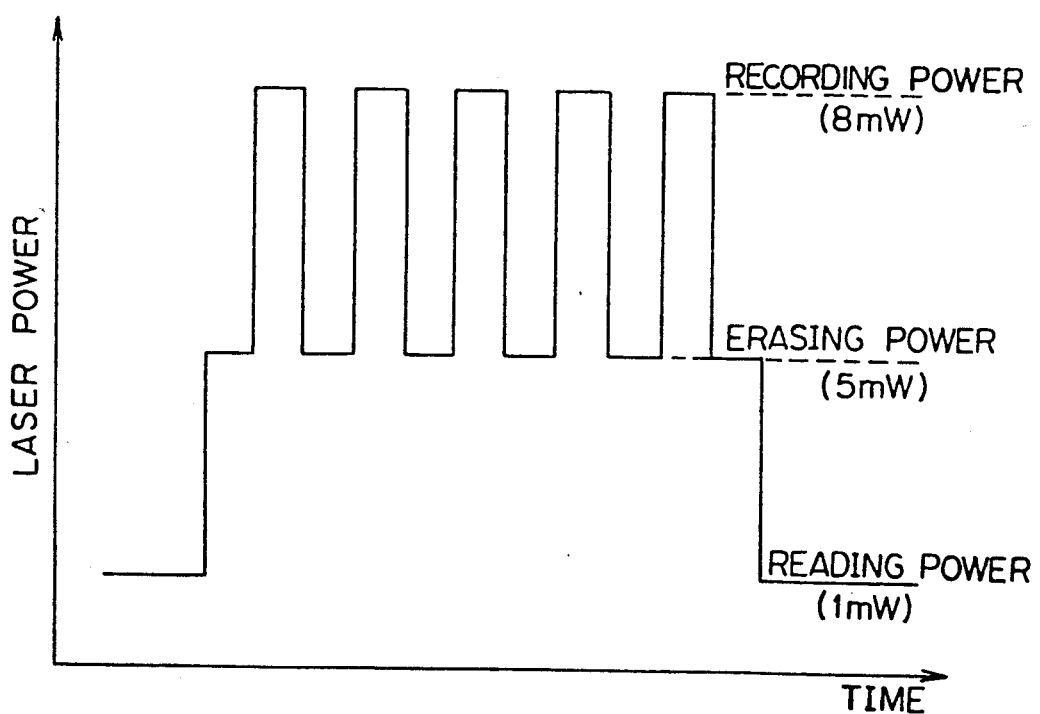
FIG. 3 shows one form of waveform of laser beam irradiations for recording and erasing information.

In the case where the crystallization of a recording layer is effective for erasing information recorded on the recording layer and the amorphization of the recording layer is effective for recording information on the recording layer, pits constituted by amorphous areas are formed by irradiating with pulses of a laser beam having a relatively high intensity so that a predetermined information is recorded and, on the other hand, the amorphous areas other than those formed by irradiating with the pulses of a laser beam are crystallized by irradiating with pulses of a laser beam having a relatively low intensity at intervals of the respective pulses of laser beam for amorphization as is seen from FIG. 3, so that the previously recorded information is erased.

Alternatively, in the case where the crystallization of a recording layer is effective for recording information on the recording layer and the amorphization of the recording layer is effective for erasing information recorded on the recording layer, pits constituted by crystalline areas are formed by irradiating with pulses of a laser beam having a relatively low intensity so that information is recorded and, on the other hand, the crystalline areas other than those formed by irradiating with the pulses of a laser beam are amorphized by irradiating with a laser beam having a relatively high intensity at intervals of the respective pulses of laser beam for crystallization as is seen from FIG. 3, so that the previously recorded information is erased.

When the recorded information is read out from the recording layer, the difference in optical properties such as reflectance and transmission between the amorphous areas and the crystalline areas is utilized. Particularly, a laser beam having an intensity much lower than that for crystallizing a recording layer is irradiated on the recording layer and the difference in reflectance or transmission of the irradiated laser beam between the crystalline areas and the amorphous areas is measured and converted to a signal of a desired form.

In practicing the recording and erasing of information, a recording medium is migrated relative to a laser beam. When the relative migration rate of the recording medium to the laser beam is indicated by v and the diameter of a laser beam spot which is applied on the surface of the recording medium is indicated by d, the laser beam irradiation time at a certain point on the surface of the recording medium can be indicated as d/v. Therefore, in the case where the crystallization is effective for erasing information and the amorphization is effective for recording information, if it is intended to erase information, an amorphous area (in which information has been recorded) must be crystallized by the laser beam irradiation for a period of d/v or less. The recording layer having a composition represented by formula (1) can be crystallized by the laser beam irradiation for a period of time as short as 1 $\mu$sec or less. Therefore, the erasing of information can be sufficiently conducted using a laser beam having a spot diameter of about 1 $\mu$m. Particularly in the case where the ratios of Sb, Te and Ge in the recording layer are within the range as indicated by square ABEG shown in FIG. 1, the crystallization of a recording layer can be conducted by the laser beam irradiation for a period of time as short as 0.1 $\mu$sec or less. Therefore, when a laser beam having a spot diameter of about 1 $\mu$m, the crystallization can be made even if the relative migration rate of the recording medium to the laser beam is as high as 10 m/sec or more. At present, the relative migration rate adopted for information storage on a optical disk is generally about 1.2 m/sec or less in the case of a compact disk, about 5 to 11 m/sec in the case of a file memory, and about 5 to 22 m/sec in the case of a computer memory. Therefore, the method of the present invention can be conveniently applied to various optical data storage. Further, since the time for crystallization can be decreased to a degree as short as 1 $\mu$sec or less as different from the case of the conventional methods, it is not necessary to use two different laser beams, i.e. a laser beam having a circular beam spot for the amorphization and a laser beam having an elliptic beam spot for the crystallization, and it is possible to perform the crystallization and amorphization of a recording layer with only a single laser beam having, for example a circular beam spot. Accordingly, by the method of the present invention, the overwriting of information on the recording medium can be performed by irradiating the recording medium with pulses of a laser beam having an intensity for recording information, while separately irradiating the recording medium with the same laser beam as used for the recording of information, which laser beam is changed only in intensity so as to have an intensity for erasing information, at intervals of the respective pulses of laser beam for recording information. Such overwriting can be performed by the use of an extremely simple optical system as in the case of a write-once optical storage method.

In irradiating with a single laser beam according to the method of the present invention, the laser beam intensity is changed between two different intensities according to the laser beam intensity pattern corresponding to the predetermined information that is intended to be recorded. As mentioned above, the two different laser beam intensities are effective for crystallizing the recording layer and amorphizing the recording layer. The intensity for the amorphization of the recording layer may be 3 to 30 mW, preferably 5 to 20 mW. The laser beam intensity for the crystallization of the recording layer is at least 1 mW lower than the laser beam intensity for the amorphization of the recording layer. Accordingly, the intensity for the crystallization of the recording layer may generally be 2 to 29 mW, preferably 3 to 15 mW, however, it should be not less than 2 mW.

The diameter of a laser beam spot which may be used in the present invention may be 0.5–1.5 $\mu$m.

Examples of lasers which may be used in the method of the present invention include a semiconductor laser, an Ar ion laser, a YAG laser and the like. It is preferred for high-density recording that the wavelength of the laser be reduced to half by passing the laser through a nonlinear optics and applied to the recording layer as a laser beam for recording and erasing information. The wavelength of the laser beam may generally be 300 nm to 1 $\mu$m.

Examples of substrates to be used in the recording medium include a glass plate, a plate comprising glass and superimposed thereon a photo-curable polymer layer, films and plates of plastic materials such as polycarbonate, acrylic resin, epoxy resin and polystyrene, and a plate of an Al alloy.

Of the above-mentioned substrates, a plate comprising glass and superimposed thereon a photo-curable polymer, and a transparent plastic plate of a polycarbonate, acrylic resin or epoxy resin are preferred, because a laser beam for information recording and erasing and readout of the recorded information can be irradiated through the substrate.

The recording layer composed of Sb, Te, Ge and at least one element M may be formed on a substrate by customary deposition methods such as vacuum deposition and sputtering. In the case of vacuum deposition, it is noted that, when an alloy composed of Sb, Te, Ge and the element M is employed as a deposition source for effecting deposition, the resulting recording layer often has a composition considerably different from that of the alloy used as the source. Hence, it is preferable that the deposition be effected using four separate deposition sources, respectively, for Sb, Te, Ge and element M. When an alloy composed of Sb, Te, Ge and element M is employed as a deposition source, the flash deposition method is more preferable than the above-mentioned deposition method because the difference between the composition of the alloy and that of the resulting recording layer can be minimized.

In the case of the formation of the recording layer by the sputtering method, an alloy having a predetermined composition may advantageously be used as a deposition source, because a recording layer having substantially the same composition as that of the alloy can be obtained. Alternatively, the recording layer may be formed in such a manner that pieces of a metallic element or alloy are placed on another metallic element or alloy, followed by sputtering. In this method, the number of the pieces and the positions of the metallic elements or alloys may be varied according to the composition of the recording layer to be formed. In the case of the sputtering method, the substrate is apt to be heated during the sputtering operation and, hence, it is preferable to sufficiently cool the substrate for forming a recording layer having a uniform recording characteristic.

The recording medium to be used in the present invention comprises a substrate and superimposed thereon a recording layer. If desired, a reflective layer may be provided on the recording medium. By the provision of a reflective layer, a high contrast of reflectivity due to a light interference effect can be attained, leading to a high carrier-to-noise ratio (hereinafter often referred to as "C/N ratio"), even when the thickness of the recording layer is small. In addition, if desired, a dielectric layer may also be provided between the recording layer and the reflective layer. By the provision of a dielectric layer, there can be attained an improvement in storage stability, C/N ratio and number of cycle of reversions between recording and erasing. With respect to the structure of a recording medium in the case where a reflective layer and a dielectric layer are provided, reference may be made to, for example, IEEE Journal of Quantum Electronics, Vol. QE-14, No. 7, pp. 487-495 (1978).

The reflective layer may preferably be a layer made of a substance having a high extinction coefficient to a laser beam for readout of the recorded information. Examples of substances usable for the reflective layer include metals such as Al, Ti, Cr, Cu, Mn, Si, Ni, Se, Ge, Zr, Ag, In, Sn, Sb, Te, Pt, Au, Pb and Bi, alloys containing at least Cr, Cu, Mn, Si, Ni, Se, Ge, Zr, Ag, In, Sn, Sb, Te, Pt, Au, Pb and Bi, and the like. The reflective layer may be of a single layer structure or a multiple layer structure containing at least two metals or alloys selected from the metals and alloys mentioned above.

With respect to the dielectric layer, it is preferred that the dielectric layer be made of at least one metallic compound. Examples of metallic compounds usable for the dielectric layer include metal oxides such as MgO, $TiO_2$, $ZrO_2$, $HfO_2$, ZnO, CdO, $Al_2O_3$, $Ga_2O_3$, $SiO_2$, $GeO_2$, $Nb_2O_5$, $Ta_2O_5$, $Cr_2O_3$, $MoO_3$, CoO, NiO and the oxides of rare earth elements, metal nitrides such as TiN, HfN, AlN and $Si_3N_4$, metal sulfides such as ZnS, and metal carbonates such as SiC and TiC.

The reflective layer and the dielectric layer may be formed by the vacuum deposition method or sputtering method as in the formation of the recording layer. Alternatively, the reflective layer and the dielectric layer may also be formed by a customary ion-plating method.

The thickness of the recording layer may be varied according to the structure of the recording medium, e.g. the presence or absence of a reflective layer and a dielectric layer and the thicknesses of a reflective layer and a dielectric layer. Generally, the thickness of the recording layer may be about 10 to 150 nm.

The recording medium to be used in the present invention may generally be in a single form. The recording medium to be used in the present invention may alternatively be in a composite form, e.g. in the form of two recording media attached in face-to-face fashion with an air gap therebetween as will be mentioned later so that the surface of the recording layer can be protected against danger and/or stain which is caused, for example, by direct contact of the recording layer with air or hands. Such a structure is constructed so that the side of the recording layer is on the inside of the structure. In such a case, the beam irradiation for information recording and erasing and for readout of the recorded information is effected from the side of the substrate.

As described above, the recording medium of the present invention may be used in a single form or a composite form. In the case of the composite form as mentioned above, the recording medium is used as follows. Two recording media having the same structure are put, one upon the other, so that the side of the recording layer remote from the substrate of one recording medium faces the side of the recording layer remote from the substrate of the other recording medium through the medium of a spacer arranged along the periphery of each of the recording media, and partially bonded by means of an adhesive such as epoxy type adhesive applied to both the sides of the spacer. Alternatively, the two recording media may be entirely bonded to each other by means of an adhesive such as a hot melt adhesive, with the side of the recording layer remote from the substrate of one recording layer facing the side of the recording layer remote from the substrate of the other recording medium, without using a spacer to form an entirely bonded structure.

According to the method of the present invention, information can be recorded and erased in a short period of time by the irradiation with a single laser beam. Therefore, according to the present invention, overwriting of information can be performed using a simple optical system by changing only the irradiating laser beam intensity between two different intensities respectively for amorphizing a recording layer and for crystallizing a recording layer in accordance with a laser beam intensity pattern corresponding to a predetermined information to be recorded.

DETAILED DESCRIPTION OF PREFERRED EMBODIMENTS

The present invention will now be described in more detail with reference to the following Examples, which should not be construed as limiting the scope of the present invention.

REFERENTIAL EXAMPLE

A polycarbonate disk having a thickness of 1.2 mm and a diameter of 130 mm and having grooves (depth: 70 nm, width: 0.5 $\mu$m, pitch: 1.6 $\mu$m) prepared by the injection molding method is used as a substrate and set in a vacuum deposition equipment so that the polycarbonate disk can be rotated in the central portion of the equipment. The equipment include, around the axis of rotation, two heating vaporization boats and two electron beam vaporization crucibles, and is adapted for performing 4-element co-deposition. Te and Sb are separately put in the crucibles, and Ge is put in one of the heating vaporization boats. The equipment is evacuated to $10^{-6}$ Torr and the disk is subjected to simultaneous deposition of Sb, Te and Ge from the boats and crucible at room temperature while rotating the disk at 1800 rpm to perform co-deposition of the three elements. Repeating the same procedure as mentioned above except that the atomic ratios of the elements are changed as indicated in Table 2, 100 nm-thick recording layers having compositions as shown in Table 2 are separately formed on polycarbonate disks.

TABLE 2

| Sample No. | Composition of recording layer $Te_xGe_ySb_{1-x-y}$ | | Amorphization characteristics | | Crystallization characteristics | | |
|---|---|---|---|---|---|---|---|
| | X | Y | $P_W$ (mW) | C/N ratio (dB) | $P_E$ (mW) | ΔC (dB) | τ (μsec) |
| a | 0.45 | 0.2 | 14 | 50 | 7 | 15 | 0.1 |
| b | " | 0.3 | 16 | 48 | 8 | 12 | 0.1 |
| c | " | 0.4 | 18 | 48 | 9 | 18 | 0.1 |
| d | 0.55 | 0.2 | 19 | 40 | 10 | 10 | 0.05 |
| e | " | 0.3 | 20 | 40 | 10 | 10 | 0.08 |
| f | 0.65 | 0.2 | 14 | 38 | 8 | 5 | 0.3 |
| g | " | 0.3 | 14 | 37 | 8 | 5 | 0.5 |

The values of x and y indicated in Table 2 are confirmed by inductively coupled plasma (ICP) spectroscopy. Further, each of the recording layer formed on the polycarbonate disk is analyzed by X-ray diffractometry, to thereby confirm that each recording layer is amorphous.

Figure 2:
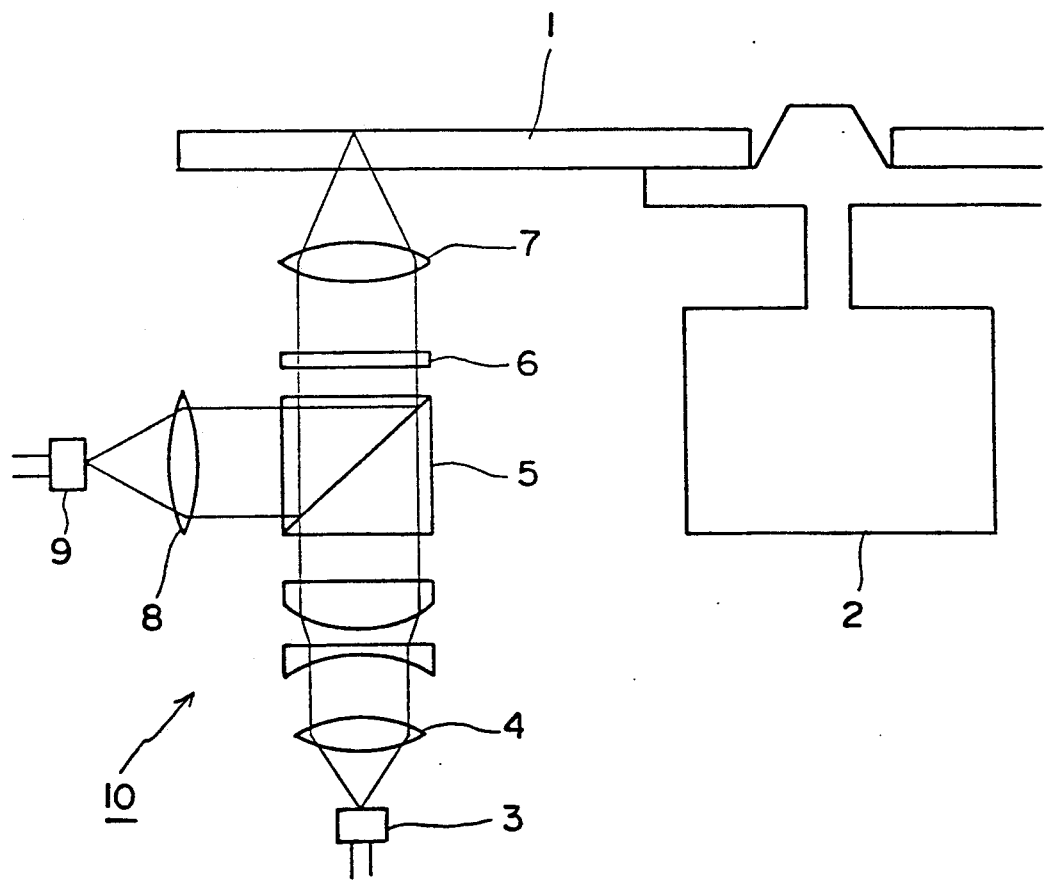
FIG. 2 is a diagrammatic view illustrating a system for practicing the method of the present invention.

The thus prepared sample recording media are subjected to examination with respect to their amorphization characteristics and crystallization characteristics using laser beam irradiation apparatus 10 as shown in FIG. 2. As shown in FIG. 2, laser rays are emitted from semiconductor laser apparatus 3 and made parallel by means of lens 4. The laser beam thus obtained is then passed through the other lenses, prism 5 and ¼ wave plate 6 and focused through objective lens 7. The focused laser beam is irradiated on the surface of disk 1 (recording medium) which is being rotated by means of motor 2. The irradiated laser beam is reflected by the recording medium and the reflected beam goes back to prism 5 through objective lens 7 and ¼ wave plate and reflected by prism 5 toward lens 8. The laser beam reflected by prism 5 is focused through lens 8 and detected by detector 9. The examination is performed as follows.

(1) A laser beam having a wave length of 830 nm and a beam spot diameter of about 1.0 μm is applied to the recording layer of each sample disk through its substrate so as to irradiate a portion of the recording layer which is positioned at a distance of 55 mm from the center of the disk. The irradiation of the recording layer of the sample disk with the laser beam is conducted with rotation of the disk at 1800 rpm (the linear velocity of the disk relative to the laser beam is approximately 10 m/sec) for one rotation of the disk (33.3 msec), while increasing the laser beam power and simultaneously measuring the reflectance of the laser beam. As a result, it is found that with respect to all of the sample disks, the reflectance is increased to a certain extent according to the increase in laser beam intensity, and when the laser beam intensity exceeded a certain level, the reflectance no longer increased. The laser beam intensity ($P_E$) beyond which the reflectance no longer increased is measured with respect to each sample disk and the results are shown in Table 2.

Incidentally, the recording layer of each sample disk is analyzed by X-ray diffractometry before and after the irradiation with a laser beam. As a result, it is found that with respect to all of the sample disks, the recording layer is amorphous before the irradiation with a laser beam and crystalline after the irradiation with a laser beam having an intensity of $P_E$.

(2) The recording layer of each sample disk is entirely crystallized by the irradiation with a laser beam having an intensity of $P_E$. Then, pulse signals of 3 MHz are recorded on the recording layer of each disk sample by the irradiation with a laser beam, while increasing the intensity of a laser beam. After the recording, the recorded signals are read out by irradiating the recording layer with the same laser beam as that used for recording except that the laser beam intensity is changed to 1.0 mW, while measuring the intensity of the reflected laser beam by means of detector 9. The measurement shows that with respect to all of the sample disks, the readout signal intensity is increased to a certain level according to the increase in the laser beam intensity for recording the pulse signals, but when the laser beam intensity for recording pulse signals exceed a certain level, the readout signal intensity no longer increase. The laser beam intensity ($P_W$) beyond which the read-out signal intensity no longer increased is measured with respect to each sample disk and the results are shown in Table 2.

Further, the readout signals are analyzed using a spectrum analyzer model hp 8567A (manufactured and sold by Hewlett-Packard, U.S.A.) with a resolution bandwidth of 30 kHz to measure a carrier-to-noise ratio (hereinafter referred to as "C/N ratio"). The C/N ratios obtained with respect to the signal recorded by the irradiation with the laser beam intensity of $P_W$ are shown in Table 2.

(3) The above-recorded signals are erased by continuously irradiating with a laser beam having an intensity of $P_E$ for each sample disk and, thereafter, the C/N ratio of the signal remaining unerased is measured in the same manner as mentioned above. Then, an erasing ratio is calculated from the C/N ratios before and after the erasing operation by the following equation:

$$\Delta C \text{ (erasing ratio) } (dB) = C_1 - C_2.$$

wherein $C_1$ is the level of a recorded signal (dB) and $C_2$ is the level of a signal remaining unerased (dB).

The ΔC corresponds to $20 \log_{10}(V_1/V_2)$, wherein $V_1$ is the output level obtained by reading out a recorded signal and $V_2$ is the output level obtained by reading out a signal remaining unerased. The results are shown in Table 2. The high erasing ratio means that the erasure of a signal is well performed.

(4) Separately, the time necessary for crystallizing the recording layer of each sample is measured as follows. Using the same laser beam irradiation apparatus as indicated in FIG. 2, a laser beam having an intensity of 5 mW is applied to a certain portion of the recording layer of each sample disk without rotating the disk. The irradiation with a laser beam is conducted pulsewise while increasing the length of the pulse from 0.05 to 10 μsec. For each pulse, the reflectance is measured, and the minimum length of the pulse (τ) at which the reflectance exceeds 80% of the maximum value obtained by the irradiation with a laser beam is also measured. The results are shown in Table 2. The value of is a useful index for estimating the time of irradiation with a laser beam necessary for crystallizing a recording layer.

As is apparent from the results in Table 2, the amorphization (recording) characteristics and crystallization (erasing) characteristics of the sample disk comprising a recording layer composed of Sb, Te and Ge are markedly different between the case where the atomic ratios of Sb, Te and Ge in the recording layer are within the range of the formula (3) mentioned before and the case where the atomic ratios of Sb, Te and Ge are outside the range of the formula (3). That is, with respect to the sample disks (d) and (e) of which the recording layer has atomic ratios of Sb, Te and Ge within the range of the formula (3), the crystallization of the recording layer can be attained by extremely short-time irradiation with a laser beam. However, sample disks (d) and (e) have disadvantages in that an extremely high laser beam intensity is required for amorphizing the recording layer and that the C/N ratio is low. On the other hand, the sample disks (a), (b) and (c) of which the recording layer has atomic ratios of Sb, Te and Ge which are outside the range of the formula (3), high C/N ratios can be obtained. However, these disks have a disadvantage in that long-time irradiation with a laser beam is required for crystallizing the recording layer. Further, the laser beam intensity necessary for amorphizing the recording layer can be decreased to some extent, but can not be satisfactorily decreased. With respect to the sample disks (f) and (g) of which the recording layer also has atomic ratios of Sb, Te and Ge which are outside the range of the formula (3), the laser beam intensity necessary for amorphizing the recording layer can be decreased to some extent as in the case of sample disks (a), (b) and (c), but can not be satisfactorily decreased. Further, these disks (f) and (g) have disadvantages in that long-time irradiation with a laser beam is required for crystallizing the recording layer and that the C/N ratio is low.

All of the sample disks are observed using an electron microscope. The observation shows that undesirable deformation of the recording layer as well as the substrate occurred. It seems that such deformation of the recording layer and the substrate is caused by the irradiation with a laser beam having a relatively high intensity. Further, it seems that such deformation causes the C/N ratio of each sample disk to decrease to a level as low as 20 dB or less.

EXAMPLE 1

A 80 nm-thick recording layer composed of Te, Ge, Sb and Tl which are present in atomic ratios represented by the formula: $(Te_{0.45}Ge_{0.3}Sb_{0.25})_{0.8}Tl_{0.2}$ is formed on the same polycarbonate substrate as used in Referential Example by the sputtering deposition method as follows. A polycarbonate substrate is set in a sputtering deposition equipment including a cathode for sputtering. An alloy of Te, Ge, Sb and Tl having atomic ratios represented by the formula mentioned just above and having a diameter of about 8 inches is placed on the cathode, and the equipment is evacuated to $10^{-6}$ Torr. Then, argon gas is introduced into the equipment so that the inner pressure of the equipment became $3 \times 10^{-3}$ Torr. Thereafter, about $-350$ V of an electric pressure is applied to the cathode to cause sputtering.

The thus obtained sample disk is examined in the same manners as in Referential Example to determine the $P_W$, C/N ratio, $P_E$ and $\Delta C$. The results are shown below:

$P_W$: 8 mW
C/N ratio : 56 dB
$P_E$: 5 mW
$\Delta C$ : 40 dB.

Then, the recording layer of the sample disk is re-irradiated with a laser beam while changing its intensity in accordance with the laser beam intensity pattern as shown in FIG. 3 to form amorphized areas and crystallized areas on the recording layer, and the $P_W$, C/N ratio, $P_E$ and C are measured. In this Example, the amorphization and the crystallization are designed so as to correspond to the recording of information and the erasing of information, respectively. Therefore, in FIG. 3, the recording power and erasing power correspond to the amorphizing intensity and the crystallizing intensity, respectively. The above measurement shows that the $P_W$, C/N ratio, $P_E$ and $\Delta C$ obtained by the re-irradiation with a laser beam are substantially the same as those obtained by the first irradiation of a laser beam. The re-irradiation with a laser beam by changing its intensity between the amorphizing intensity and the crystallizing intensity as shown in FIG. 3, i.e., overwriting of the recording layer is repeated $10^3$ times, but the decrease in C/N ratio does not occur.

From the foregoing, it is confirmed that according to the method of the present invention, overwriting of information on a recording medium can be easily and repeatedly performed at a high speed with a single laser beam by changing only its intensity between the two different intensities.

EXAMPLE 2

A 80 nm-thick recording layer composed of Te, Ge, Sb and Tl which are present in atomic ratios represented by the formula: $(Te_{0.5}Ge_{0.2}Sb_{0.3})_{0.9}Tl_{0.1}$ is formed on the polycarbonate substrate as used in Referential Example by the sputtering deposition method in the same manner as in Example 1. On the recording layer of the thus obtained disk, a laser beam is applied with two different intensities in accordance with the same pattern as shown in FIG. 3 except that the amorphizing intensity (recording power) is 10 mW. The C/N ratio and the erasing ratio ($\Delta C$) are measured. The C/N ratio and the erasing ratio are as high as 54 dB and 35 dB, respectively.

EXAMPLE 3

The same polycarbonate disk as used in Referential Example is set in the same vacuum deposition equipment as used in Referential Example. Te and Sb are separately put in the respective crucibles and Ge and Pb are separately put in the respective heating vaporization boats so that a recording layer to be formed by the following deposition can have the atomic ratios represented by the formula: $(Te_{0.45}Ge_{0.3}Sb_{0.25})_{0.90}Pb_{0.10}$. The equipment is evacuated to $10^{-6}$ Torr and the disk is subjected to simultaneous deposition of Sb, Te, Ge and Pb from the boats and crucibles at room temperature while rotating the disk at 1800 rpm to perform co-deposition of the four elements, until the thickness of the recording layer formed by the deposition became 100 nm. Thus, sample disk (h) is obtained.

Substantially the same procedure as mentioned above is repeated except that each of Bi, In, Sn and Tl is separately used instead of Pb, to thereby prepare sample disks (i) to (l).

Each sample disk thus obtained is subjected to examination with respect to amorphization characteristics and crystallization characteristics in the same manner as in Referential Example to thereby determine $P_W$, C/N ratio, $P_E$ and $\Delta C$. The results are shown in Table 3.

TABLE 3

| Sample No. | Element contained | Amorphization characteristics | | Crystallization characteristics | |
|---|---|---|---|---|---|
| | | $P_W$ (mW) | C/N ratio (dB) | $P_E$ (mW) | ΔC (dB) |
| h | Pb | 9 | 55 | 6 | 38 |
| i | Bi | 12 | 48 | 7 | 40 |
| j | In | 12 | 52 | 9 | 30 |
| k | Sn | 11 | 52 | 8 | 30 |
| l | Tl | 9 | 56 | 7 | 38 |

The comparison between the results in Table 3 and the results of sample (b) in Table 2 (Referential Example) shows that by the presence of Pb, Bi, In, Sn or Tl in the recording layer, the laser beam intensities necessary for the amorphization and crystallization are markedly decreased, and the C/N ratio is markedly improved, that is, the C/N ratios of sample disks (h) to (l) are about 18 to 28 dB higher than that of sample disk (b). Accordingly, it is concluded that these sample disks are practically useful. Particularly, in the case where Pb or Tl is incorporated in the recording layer [namely, each of sample disks (h) and (l)], the C/N ratio is excellent and, therefore, it is expected that a good signal quality can be obtained when such disks are used as a recording medium.

None of sample disks (h) to (l) undergo deformation of the recording layer and the substrate.

On the recording layer of sample disk (j), a laser beam is applied with two different intensities in accordance with the same pattern as shown in FIG. 3 except that the amorphizing intensity (recording power) and the crystallizing intensity (erasing power) are 12 mW and 7 mW, respectively, and the C/N ratio and the erasing ratio are measured. The C/N ratio and the erasing ratio are as high as 50 dB and 28 dB, respectively.

From the foregoing, it is concluded that using a recording medium comprising a substrate and superimposed thereon a recording layer which contains Pb, Bi, In, Sn or Tl in addition to Sb, Ge and Te, the amorphization and crystallization of the recording layer (namely, recording and erasing of information on the recording layer, and vice versa) can be readily performed by the irradiation with a single laser beam by changing only the laser beam intensities.

EXAMPLE 4

Recording layers which are composed of Te, Ge, Sb and Tl at atomic ratios as shown in Table 4 and have a thickness of 80 nm are separately formed on polycarbonate substrates as used in Referential Example by the 4-element co-deposition method in substantially the same manner as in Example 3. Thus, there are obtained sample disks (m) to (q). The sample disks are examined in the same manners as in Referential Example to determine the $P_W$, C/N ratio, $P_E$ and ΔC of each sample disk. The results are shown in Table 4.

As is apparent from the results in Table 4, it is confirmed that when the composition of the recording layer is within the range as defined in the above-mentioned formula (1), i.e. in the formula (1), x is within the range of from 0.3 to 0.7 and y is 0.1 or more, the crystallization and amorphization can be performed by the irradiations with a single laser beam with two different intensities which are relatively low, and high C/N ratios and high erasing ratios are obtained.

On the recording layer of sample disk (o), a laser beam is applied with two different intensities in accordance with the same pattern as shown in FIG. 3 except that the recording power is 9 mW, and the C/N ratio and the erasing ratio are measured. The C/N ratio and the erasing ratio are as high as 53 dB and 35 dB, respectively.

TABLE 4

| Sample No. | Composition of the recording layer $(Te_xGe_ySb_{1-x-y})_{0.85}Tl_{0.15}$ | | Amorphization characteristics | | Crystallization characteristics | |
|---|---|---|---|---|---|---|
| | X | Y | $P_W$ (mW) | C/N ratio (dB) | $P_E$ (mW) | ΔC (dB) |
| m | 0.35 | 0.15 | 7 | 52 | 5 | 28 |
| n | " | 0.55 | 12 | 48 | 6 | 28 |
| o | 0.5 | 0.3 | 9 | 55 | 6 | 40 |
| p | 0.65 | 0.15 | 12 | 52 | 8 | 30 |
| q | " | 0.3 | 12 | 40 | 8 | 26 |

EXAMPLE 5

Recording layers which are composed of Te, Ge, Sb and Pb at atomic ratios as shown in Table 5 and have a thickness of 100 nm are separately formed on polycarbonate substrates as used in Referential Example by the 4-element co-deposition method in substantially the same manner as in Example 3. Thus, there are obtained sample disks (s) to (v).

For comparison, substantially the same procedure as mentioned above is repeated except that Pb omitted from the elements to be co-deposited and a recording layer composed of only Te, Ge and Sb is formed, to thereby obtain sample disk (r).

The sample disks thus obtained are examined in the same manner as in Referential Example to determine the $P_W$, C/N ratio, $P_E$ and ΔC of each sample disk. The results are shown in Table 5. As is apparent from the results in Table 5, in the case of the sample disk (r) having a recording layer not containing Pb, the amorphization is performed only by the irradiation with a laser beam having relatively high intensity, namely as high as 18 mW, and the erasing ratio (ΔC) is low. By contrast, in the case of the sample disks (s) to (u) each having a recording layer containing Pb in an amount of 1 to 30% in terms of the number of atoms, the amorphization can be performed by the irradiation having a relatively low intensity, namely from 9 to 12 mW, and the erasing ratio (ΔC) are improved as compared to the sample disk (r). However, if the amount of Pb in the recording layer is increased to 50 % in terms of the number of atom [sample disk (v)], the erasing ratio (ΔC) and C/N ratio are decreased. These results show that the amount of elements other than Te, Ge and Sb is preferably 1 to 30 % in terms of the number of atoms, that is, $0.01 \leq z \leq 0.3$ in formula (1).

In the case of sample disks (s) to (u), the irradiation with a laser beam by changing its intensity between the amorphizing intensity and the crystallizing intensity i.e. overwriting of the recording layer can be performed.

TABLE 5

| Sample No. | Composition of the recording layer $(Te_{0.5}Ge_{0.3}Sb_{0.2})_{1-z}Pb_z$ Z | Amorphization characteristics | | Crystallization characteristics | |
|---|---|---|---|---|---|
| | | $P_W$ (mW) | C/N ratio (dB) | $P_E$ (mW) | ΔC (dB) |
| r | 0 | 18 | 43 | 9 | 15 |
| s | 0.01 | 12 | 52 | 8 | 38 |
| t | 0.2 | 10 | 56 | 6 | 40 |

TABLE 5-continued

| Sample No. | Composition of the recording layer $(Te_{0.5}Ge_{0.3}Sb_{0.2})_{1-z}Pb_z$ Z | Amorphization characteristics $P_H$ (mW) | C/N ratio (dB) | Crystallization characteristics $P_E$ (mW) | $\Delta C$ (dB) |
|---|---|---|---|---|---|
| u | 0.3 | 9 | 48 | 6 | 36 |
| v | 0.5 | 9 | 30 | 5 | 22 |

What is claimed is:

1. A method for recording and erasing information, which comprises irradiating a recording medium comprising a substrate, having superimposed thereon a recording layer composed of Sb, Te, Ge and at least one element selected from the group consisting of Pb, Bi, In, Sn and Tl, with a single laser beam, while migrating said recording layer relative to said single laser beam, Sb, Te, Ge and said element selected from the group consisting of Pb, Bi, In, Sn and Tl, being present in said recording layer in atomic ratios represented by the formula:

$$(Te_xGe_ySb_{1-x-y})_{1-z}M_z$$

wherein M is at least one element selected from the group consisting of Pb, Bi, In, Sn and Tl, and $0.3 \leq x \leq 0.7$, $0.1 \leq y$, $0.01 \leq z \leq 0.3$ and $x+y<1$, said recording layer being capable of reversibly converting between an amorphous phase and a crystalline phase in accordance with a laser beam intensity applied to the recording layer, the reversible conversion being effective for recording and erasing information, said single laser beam being applied with two different intensities, respectively, for crystallizing said recording layer and for amorphizing said recording layer, while changing the laser beam intensity between said two different intensities in accordance with a laser beam intensity pattern corresponding to predetermined information, to thereby form amorphous areas and crystalline areas in the recording layer, which correspond to said predetermined information.

2. The method according to claim 1, wherein the crystallization of said recording layer is effective for recording information on said recording layer and the amorphization of said recording layer is effective for erasing information recorded on said recording layer.

3. The method according to claim 1, wherein the crystallization of said recording layer is effective for erasing information recorded on said recording layer and the amorphization of said recording layer is effective for recording information on said recording layer.

4. The method according to claim 3, wherein M is Pb.

5. The method according to claim 3, wherein M is Tl.

* * * * *